United States Patent Office 3,231,565
Patented Jan. 25, 1966

3,231,565
COMPLEX AMIDES OF DIHYDRODIBENZO[b,e]-
[1,4]DIAZEPINE-10-CARBOXYLIC ACIDS
John W. Cusic and William E. Coyne, Skokie, Ill.,
assignors to G. D. Searle & Co., Chicago, Ill., a corporation of Delaware
No Drawing. Filed Nov. 6, 1964, Ser. No. 409,612
5 Claims. (Cl. 260—239)

The present invention relates to a group of compounds which are derivatives of dihydrodibenz[b,e][1,4]diazepine-10-carboxylic acids. More particularly, it relates to a group of compounds having the following general formula

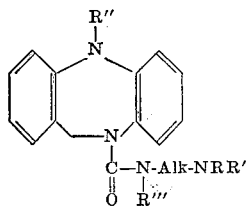

wherein Alk is lower alkylene separating the nitrogens attached thereto by at least 2 carbon atoms; —NRR' is selected from the group consisting of di(lower alkyl)-amino, piperidino, 1-pyrrolidinyl, 4-methyl-1-piperazinyl, and N-benzylmethylamino; R'' is hydrogen or lower alkyl; R''' is hydrogen or methyl.

The lower alkylene radicals referred to above contain up to 6 carbon atoms and can be illustrated by radicals such as ethylene, trimethylene, and 1,4-pentylene. The lower alkyl radicals referred to above likewise contain up to 6 carbon atoms and can be exemplified by radicals such as methyl, ethyl, propyl, and butyl. Examples of di(lower alkyl)amino radicals would then be dimethylamino, diethylamino, dipropylamino, and dibutylamino.

The compounds of this invention are useful because of their pharmacological properties. In particular, they possess anti-inflammatory activity which is demonstrated by their phenylbutazone-like effect on edematous conditions. In addition, they possess anti-biotic activity against a variety of organisms. Thus, they inhibit the growth of bacteria such as *Diplococcus pneumoniae*, protozoa such as *Tetrahymena gelleii*, and algae such as *Chlorella vulgaris*. They also inhibit germination of seeds of Trifolium.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydriodic, sulfamic, citric, lactic, maleic, malic, oxalic, succinic, tartaric, cinnamic, acetic, benzoic, gluconic, ascorbic, and related acids. They also form quaternary ammonium salts with a variety of organic esters such as sulfuric, hydrohalic, and aromatic sulfonic acids. Among such esters are methyl chloride and bromide, ethyl chloride, dimethyl sulfate, and methyl benzenesulfonate.

The compounds of the present invention are prepared from the appropriate dihydrodibenzo[b,e][1,4]diazepine. Such a compound is reacted with phosgene to give the corresponding 10-carbonyl chloride which is then further reacted with the appropriate aminoalkylamine to give the compounds of the present invention. The last reaction is usually carried out with heating in an inert solvent such as 2-butanone.

The following examples are presented to further illustrate the present invention; they should not be construed as limiting it in spirit or in scope. In these examples, quantities are indicated in parts by weight unless parts by volume are specified and temperatures in degrees centigrade (°C). The relationship between parts by weight and parts by volume is the same as that between grams and milliliters.

Example 1

A solution of 60 parts of N-methyl-N-(2-nitrophenyl)-anthranilic acid methyl ester in 1600 parts of methanol is hydrogenated at 30–50 pounds per square inch using Raney nickel catalyst. The resultant hydrogenation mixture is filtered and the solvent is evaporated from the filtrate to leave a residue which is mixed with 240 parts of ethanol, 22 parts of potassium hydroxide, and 50 parts of water, and stirred for 18 hours. The solution is then refluxed for 1 hour and the ethanol solvent is removed. The resultant residue is dissolved in water and 10% hydrochloric acid is added to bring the pH to 6. The solid which precipitates is separated by filtration and the refluxed for 20 hours in 435 parts of xylene. The solid which forms is separated and then recrystallized from ethanol to give 5-methyl-10,11-dihydro-5H-dibenzo[b,e]-[1,4]diazepin-11-one melting at about 215–216° C.

A suspension is prepared from 14.3 parts of 5-methyl-10,11-dihydro-5H-dibenzo[b,e][1,4]diazepin-11-one in 210 parts of ether and it is stirred under nitrogen while a solution of 6.4 parts of lithium aluminum hydride in 70 parts of ether is added. The resultant mixture is refluxed for 45 hours and then decomposed by the cautious addition of 63.5 parts of 2% aqueous sodium hydroxide solution. The resultant suspension is filtered and the solvent is evaporated from the filtrate to give a white solid which is then recrystallized from 2-propanol. The product obtained is 5-methyl-10,11-dihydro - 5H - dibenzo[b,e][1,4]diazepine melting at about 115–117° C.

Example 2

To a solution of 30 parts of 10,11-dihydro-5H-dibenzo-[b,e][1,4]diazepin-11-one in 540 parts of acetic anhydride is added 37 parts of sulfuric acid and the resultant solution is refluxed for 10 minutes. The solution is then poured into an excess of water and the precipitate which forms is separated by filtration and air dried. This solid is then recrystallized from chloroform to give 5-acetyl-10,11-dihydro-5H-dibenzo[b,e][1,4]diazepin-11-one melting at about 254–256° C.

A suspension is prepared from 13.4 parts of 5-acetyl-10,11 - dihydro - 5H - dibenzo[b,e][1,4]diazepin - 11-one and 700 parts of ether and it is stirred under nitrogen while a solution of 13 parts of lithium aluminum hydride in 105 parts of ether is added. The resultant solution is stirred and refluxed under nitrogen for 18 hours and then cooled and decomposed by the cautious addition of 13 parts of water, 13 parts of 15% aqueous sodium hydroxide solution, and finally 39 parts of water. The resultant mixture is filtered and the solvent is evaporated from the filtrate to give a residual solid. This is recrystallized from 2-propanol to give 5-ethyl-10,11-dihydro-5H-dibenzo[b,e][1,4] diazepine melting at about 108–110° C.

Example 3

A stirred solution of 14 parts of phosgene in 45 parts of toluene is cooled to 5° C. and a solution of 22 parts of 10,11-dihydro-5H-dibenzo[b,e][1,4]diazepine and 11.7 parts of triethylamine in 800 parts of methylene chloride is added while the temperature is maintained at about 7° C. The resultant clear solution is stirred for an additional 2 hours and the solvent is then evaporated under reduced pressure. The solid residue obtained is recrystallized twice from anhydrous ethanol to give 10,11-dihydro-5H-dibenzo[b,e][1,4]diazepine-10-carbonyl chloride melting at about 173–175° C.

Example 4

9.8 parts of 5-ethyl-10,11-dihydro-5H-dibenzo[b,e]-[1,4]diazepine and 4 parts of triethylamine in 135 parts of methylene chloride is added to a stirred solution of 5 parts of phosphene in 25 parts of toluene and 50 parts of ether while the temperature is maintained at 7° C. and the resultant mixture is stirred for 1 hour. The reaction mixture is then filtered, the residue is washed with ether and the solvent is evaporated from the combined filtrates under reduced pressure. The resultant residue is then recrystallized from petroleum ether to give 5-ethyl-10,11-dihydro-5H-dibenzo[b,e][1,4]diazepine-10-carbonyl chloride melting at about 162–164° C.

Example 5

To a stirred solution of 4.5 parts of phosgene in 25 parts of toluene at 5° C. there is first added 55 parts of ether and then a solution of 9.8 parts of 5-methyl-10,11-dihydro-5H-dibenzo[b,e][1,4]diazepine and 4.7 parts of triethylamine in 100 parts by volume of a 50% ether-methylene chloride mixture. The temperature is maintained at 5° C. during the addition and the mixture is stirred for an additional 30 minutes at this temperature after the addition is complete. The resultant suspension is filtered and the solvent is evaporated from the filtrate to give a white solid which is crude 5-methyl-10,11-dihydro-5H-dibenzo[b,e][1,4]diazepine-10-carbonyl chloride. This crude solid is dissolved in 160 parts of 2-butanone together with 5.4 parts of 2-diethylaminoethylamine and the resultant solution is refluxed for 18 hours. The butanone solvent is then evaporated from the solution under reduced pressure and the residue is mixed with sufficient aqueous potassium hydroxide solution to give an alkaline mixture. This mixture is then extracted with ether and the combined ether extracts are dried over anhydrous potassium carbonate. Evaporation of the solvent from the ether solution gives an oil which is treated with a 2-propanol solution containing 4.4 parts of dry hydrochloric acid. Ether is added to precipitate the hydrochloride which is then separated and recrystallized twice from 2-propanol to give N-(2-diethylaminoethyl)-5-methyl-10,11-dihydro-5H-dibenzo[b,e][1,4]diazepine-10-carboxamide hydrochloride melting at about 184–185° C. The free base of this compound has the following formula

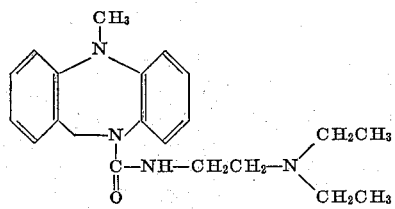

Example 6

A solution of 4.8 parts of 5-ethyl-10,11-dihydro-5H-dibenzo[b,e][1,4]diazepine-10-carbonyl chloride and 2 parts of 2-diethylaminoethylamine in 125 parts of 2-butanone is refluxed for 18 hours. The solvent is then evaporated under reduced pressure and the oily residue is mixed with water and sufficient aqueous potassium hydroxide solution to give an alkaline suspension. The suspension is extracted with several portions of ether and the combined ether extracts are dried over anhydrous potassium carbonate. The ether solvent is evaporated and the residual amine is dissolved in ethyl acetate and treated with charcoal. The ethyl acetate is then evaporated and the residual oil is washed with water to give an amber oil which is N-(2-diethylaminoethyl)-5-ethyl-10,11-dihydro-5H-dibenzo[b,e][1,4]diazepine-10-carboxamide. This oil solidifies on standing.

If an equivalent quantity of 3-dimethylaminopropylamine is substituted for the 2-diethylaminoethylamine and the above procedure is repeated, the product obtained is N-(3-dimethylaminopropyl)-5-ethyl-10,11-dihydro-5H-dibenzo[b,e][1,4]diazepine-10-carboxamide.

Example 7

2 parts of 10,11-dihydro-5H-dibenzo[b,e][1,4]-diazepin-10-carbonyl chloride and 0.9 part of 2-diethylaminoethylamine in 120 parts of 2-butanone is refluxed for 5.5 hours. The butanone is removed under reduced pressure and the residue is treated with aqueous potassium hydroxide solution and ether. The solid which precipitates is separated by filtration and combined with the solid obtained by evaporation of the solvent from the ether solution. This solid is then recrystallized from ethanol to give N-(2-diethylaminoethyl)-10,11-dihydro-5H-dibenzo[b,e][1,4]diazepine-10-carboxamide melting at about 182–185° C. This compound has the following formula

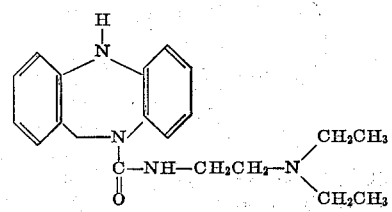

Example 8

A solution of 5 parts of 10,11-dihydro-5H-dibenzo[b,e][1,4]diazepine-10-carbonyl chloride and 2.4 parts of 2-piperidinoethylamine in 160 parts of 2-butanone is refluxed for 18 hours. The reaction mixture is cooled and the solid which precipitates is separated by filtration. The solid is recrystallized from a mixture of ethanol and ether and then from 2-propanol to give N-(2-piperidinoethyl)-10,11-dihydro-5H-dibenzo[b,e][1,4]diazepine-10-carboxamide hydrochloride melting at about 214–217° C.

Example 9

If 5-ethyl-10,11-dihydro-5H-dibenzo[b,e][1,4]diazepine-10-carbonyl chloride is reacted with the appropriate aminoalkylamine according to the procedure described in Example 6, the following compounds are obtained:

N-[2-(4-methyl-1-piperazinyl)ethyl]-5-ethyl-10,11-dihydro-5H-dibenzo[b,e][1,4]diazepine-10-carboxamide.

N-[2-(1-pyrrolidinyl)ethyl]-5-ethyl-10,11-dihydro-5H-dibenzo[b,e][1,4]diazepine-10-carboxamide.

Example 10

A solution of 5 parts of 10,11-dihydro-5H-dibenzo[b,e][1,4]diazepine-10-carbonyl chloride and 3.3 parts of N-benzyl-N,N'-dimethylethylenediamine in 200 parts of 2-butanone is refluxed for 5.5 hours. The reaction mixture is cooled and the free base is obtained as a solid. It is separated and recrystallized from ethyl acetate and petroleum ether to give N-[2-(N'-benzylmethylamino)ethyl]-N-methyl-10,11-dihydro-5H-dibenzo[b,e][1,4]diazepine-10-carboxamide melting at about 102–103° C. This compound has the following formula

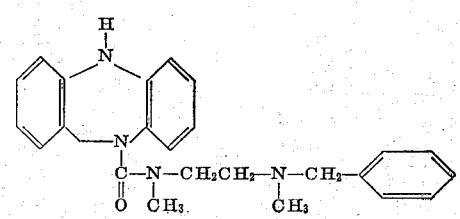

What is claimed is:
1. A compound of the formula

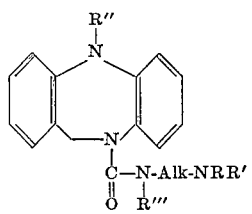

wherein Alk is lower alkylene separating the nitrogens attached thereto by at least 2 carbon atoms; —NRR' is selected from the group consisting of di(lower alkyl)-amino, piperidino, 1-pyrrolidinyl, 4-methyl-1-piperazinyl and N-benzylmethylamino; R" is selected from the group consisting of hydrogen and lower alkyl; R''' is selected from the group consisting of hydrogen and methyl.

2. A compound of the formula

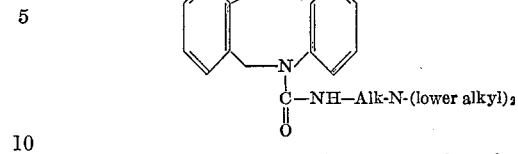

wherein Alk is lower alkylene separating the nitrogens attached thereto by at least 2 carbon atoms.

3. N-(2-diethylaminoethyl)-5-methyl - 10,11 - dihydro-5H-dibenzo[b,e][1,4]diazepine-10-carboxamide.

4. N-(2-diethylaminoethyl)-5 - ethyl - 10,11 - dihydro-5H-dibenzo[b,e][1,4]diazepine-10-carboxamide.

5. N-(2-diethylaminoethyl)-10,11-dihydro - 5H - dibenzo[b,e][1,4]diazepine-10-carboxamide.

No references cited.

NICHOLAS S. RIZZO, *Primary Examiner.*